Patented July 6, 1948

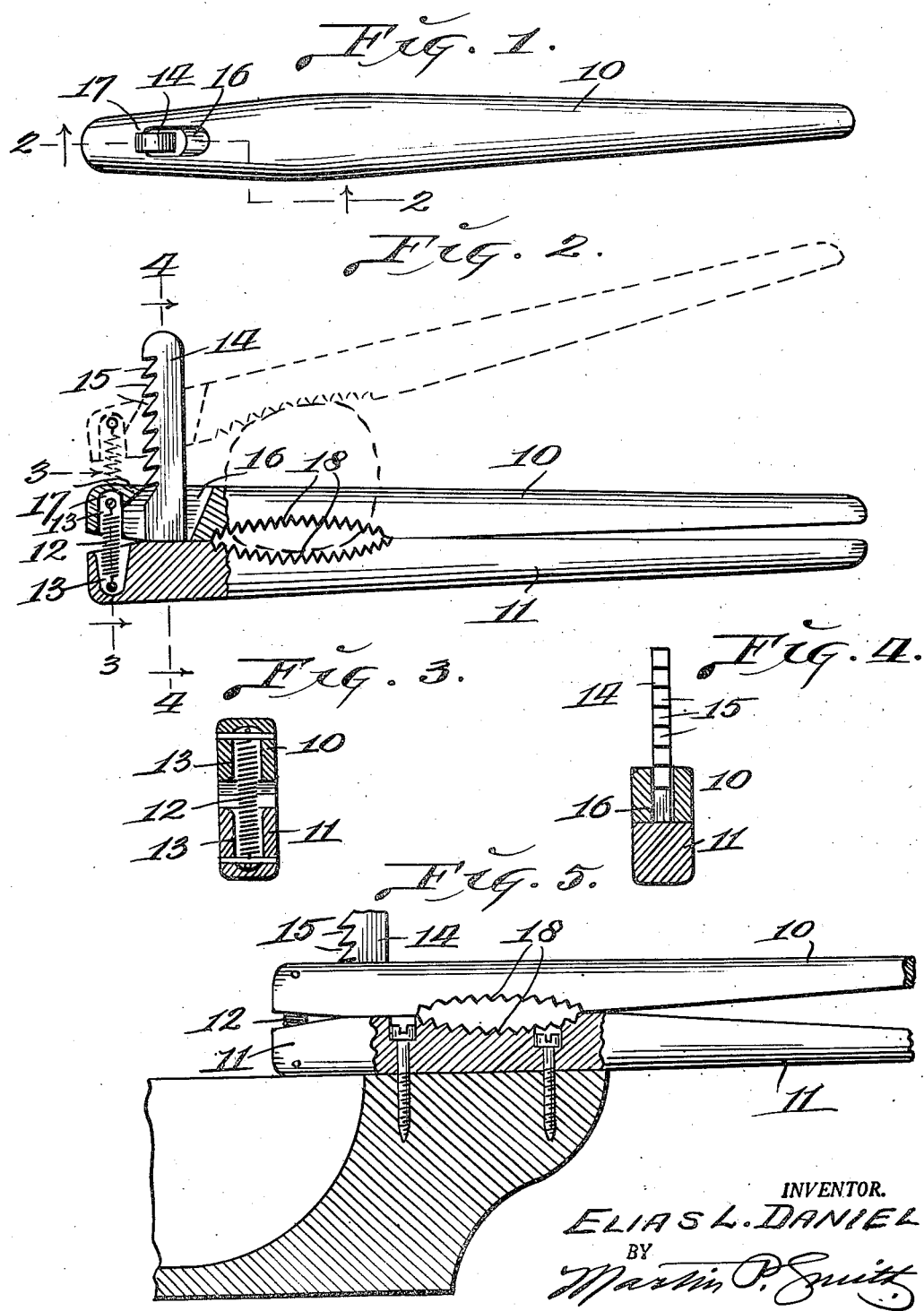

2,444,634

UNITED STATES PATENT OFFICE 2,444,634

HAND OPERATED NUTCRACKER WITH RECIPROCATING JAW

Elias L. Daniel, Los Angeles, Calif.

Application May 28, 1945, Serial No. 596,200

1 Claim. (Cl. 146—16)

My invention relates to a nut cracker and has for its principal object, to provide a simple, strong and durable device particularly designed for the efficient cracking of the shells of nuts and which device is readily adjustable, in order to receive and crack nuts of different sizes.

A further object of my invention is to provide a device of the character referred to, which may be conveniently employed for gripping and unscrewing threaded bottle and jar caps.

With the foregoing and other objects in view, my invention consists in certain novel features of construction and arrangement of parts which will be hereinafter more fully described and claimed and illustrated in the accompanying drawing, in which:

Fig. 1 is a top plan view of my improved nut cracker.

Fig. 2 is a sectional view taken on the line 2—2 of Fig. 1.

Fig. 3 is a cross section taken on the line 3—3 of Fig. 2.

Fig. 4 is a cross section taken on the line 4—4 of Fig. 2.

Fig. 5 is a sectional view showing the nut cracker secured to a nut bowl.

Referring by numerals to the accompanying drawing which illustrates a preferred embodiment of my invention, 10 and 11 designate respectively, upper and lower handles, the forward ends of which are connected by a retractile spring 12, which occupies recesses 13 formed in said handles and secured to the upper face of lower handle 11, immediately to the rear of spring 12 is an upstanding post or finger 14, provided on its forward edge with a series of notches 15.

This post passes through an aperture 16, formed in the forward portion of upper handle 10, the length of said aperture being slightly greater than the width of post 14 and formed between the upper forward end of said aperture and the upper end of the recess 13 in the upper handle, is a rearwardly projecting tooth 17 which is adapted to engage in notches 15 while the device is in use.

Formed in the underface of upper handle 10 and in the upper face of lower handle 11 to the rear of post 14 and aperture 16 are elongated shallow recesses, the surfaces of which are toothed or corrugated as designated by 18, thus in effect providing jaws for the nuts that are cracked.

In the use of my improved nut cracker, handle 10 is drawn upward away from handle 11 and at the same time the rear end of said handle is elevated with respect to its forward end, such movement expanding spring 12 and storing power therein.

The nut to be cracked is now placed between the toothed jaws 18 and the rear ends of the handles are now forcibly pressed toward each other.

During the first portion of the movement of the rear end of handle 10 toward handle 11, said handle 10 or the jaw portion thereof fulcrums on the top of the nut, thus slightly elevating and moving tooth 17 into one of the notches 15, so that said tooth now becomes the fulcrum and the ensuing pressure (weight) is applied to the nut until the shell thereof is broken.

Spring 12 yieldingly resists movement of the forward ends of the handles away from each other and after a nut is cracked and removed from between the jaws, said spring acts to draw the jaws together.

In Fig. 5, the nut cracker is shown secured by screws or the like to the edge of a nut bowl.

When tightening or lowering the screw caps of bottles, jars and the like, said caps are clamped between the toothed portions 18 of the handles.

Thus it will be seen that I have provided a nut cracker which is simple in structure, inexpensive of manufacture and very effective in the performance of its intended functions.

It will be understood that minor changes in the size, form and construction of the various parts of my improved nut cracker, may be made and substituted for those herein shown and described, without departing from the spirit of my invention, the scope of which is set forth in the appended claim.

I claim as my invention:

In a nut cracker, a pair of handles, a retractile spring connecting the forward ends of said handles, the forward portion of one handle being provided with an aperture, an integral post projecting at right angles from the other handle and extending through said aperture, the inner end well of said aperture being inclined so as to permit the apertured handle to tilt vertically when moved upwardly from the lower handle, the front edge of which post is notched, a tooth formed on the apertured handle and extending rearwardly from the upper end of said aperture, for engaging the notches on said post and the adjacent inner faces of said handles rearwardly from said aperture being provided with shallow corrugated recesses for the reception of nuts to be cracked.

ELIAS L. DANIEL.

REFERENCES CITED

The following references are of record in the file of this patent:

UNITED STATES PATENTS

| Number | Name | Date |
|---|---|---|
| 951,783 | Laube | Mar. 8, 1910 |
| 1,282,278 | Neumann | Oct. 22, 1918 |
| 1,367,384 | Harrison | Feb. 1, 1921 |
| 2,072,360 | Eaton | Mar. 2, 1937 |